__Patented Mar. 12, 1946__ 2,396,246

UNITED STATES PATENT OFFICE 2,396,246

HEAT INSULATION BLOCK

Conral C. Callis, Lancaster Township, Lancaster County, Pa., assignor to Armstrong Cork Company, Lancaster, Pa.

No Drawing. Application February 16, 1943, Serial No. 476,058

18 Claims. (Cl. 106—63)

This invention relates to heat-insulating block of improved characteristics. This application is a continuation in part of my copending patent application Serial No. 380,815, filed February 27, 1941, which is a continuation in part of my application Serial No. 336,963, filed May 24, 1940.

It is an object of the invention to provide heat-insulating blocks having a low shrinkage coefficient and substantially no warpage when subjected continually to variations of temperature from ordinary low temperatures to the high temperatures which occur in furnaces and kilns in which such block is to be used.

It is a further object of the invention to provide a heat-insulation block having good resistance to rupture under bending and compressive stresses at all temperatures to which such block is customarily subjected.

It is a further object of the invention to provide a heat-insulating block having low thermal conductivity at the elevated temperatures occurring in furnaces, kilns, and the like.

These objectives are accomplished by the use of a new composition made by the reaction in a water slurry of finely-subdivided materials comprising an artificially produced reactive, monohydrated alumina having an inherent low bulk density, a fibrous material, and a hydrated alkaline earth oxide. It appears that the alkaline earth oxide combines with part of the monohydrated alumina in the presence of moisture at ordinary room temperatures to form cementitious substances which act as binder for the composition before as well as after the constituents thereof have been formed and dried.

Any form of reactive monohydrated alumina having low bulk density may be employed, regardless of its purity or the process of its manufacture. Those produced from bauxite or any other alumina-containing mineral by any suitable process, and particularly those made in accordance with the process of United States Patent 1,953,201, April 3, 1934, are suitable. The materials resulting from the process of Patent 1,953,201 consist chiefly of aluminum oxide in the form of the monohydrate though they may contain some aluminum oxide in the form of a higher hydrate; these materials are in a very finely-divided state of subdivision, the particles being of the order of one-fourth mu ($\mu$) in size, thereby rendering the materials light in bulk density and contributing essentially to the advantageous heat-insulating properties of the compositions made from them as hereinafter described. In the specification and claims hereinafter, the expression "monohydrated alumina" is intended to include besides the reactive artificially produced monohydrated alumina per se mixtures thereof with higher hydrates, such as may result from the employment of the processes of Patent 1,953,201, or from the manufacture of the alumina by any other process.

The alkaline earth oxide used may be that of calcium, barium, magnesium, strontium, as well as a mixture of any of these, such as calcium-magnesium oxide mixture made from dolomite.

As stated above, a reactive form of monohydrated alumina is employed in order to produce a cementitious substance by reaction of the alumina with the alkaline earth oxide in the cold. Naturally occurring monohydrated aluminas, such as diaspore, are relatively inactive. They do not react to an appreciable extent when mixed with alkaline earth oxide in the presence of moisture in the cold (such as at ordinary room temperatures). In no event can a naturally occurring monohydrated alumina be reacted to produce a lightweight, strongly bonded material having desirable insulating properties. While such naturally occurring aluminas do react with alkaline earth oxides at considerably elevated temperatures, the reaction under these conditions produces a particulate substance having no cementitious properties. Furthermore, the naturally occurring hydrated aluminas are relatively dense and have, therefore, a relatively high heat conductivity which is a disadvantage for heat-insulating materials. Therefore, when monohydrated alumina is referred to hereinafter in the specification and claims, it is meant to include only an artificially produced reactive form which is in a finely-subdivided state.

To obtain the bonding of the material into a block having the desired characteristics, it has been found that the proportion of the hydrated alkaline earth oxide used should be within the limits of five per cent to twenty-two per cent by weight, when calculated as alkaline earth oxide and based on the monohydrated alumina content of the slurry. Higher percentages of the oxide up to about forty per cent may be used, but some sacrifice in strength must be made at such high proportions. The proportions that are preferred are from about eight per cent to about twenty-two per cent. For example, when lime is used, it may be used in such range, and most advantageously in proportions ranging from about ten to fourteen per cent.

The amounts and percentages of alkaline earths, as herein referred to, are calculated as alkaline earth oxides, unless otherwise specified. Either the alkaline earth hydroxides or the alkaline earth oxides may be employed, but, when the oxide is added to water, it is immediately hydrated with the evolution of heat and the slurry should be cooled so that when the reactive monohydrate alumina is added to the slurry, alkaline earth hydroxide is present and the reaction takes place at about room temperature.

Asbestos fibers are especially suitable as an incombustible auxiliary strengthening agent in the block composition, but other fibers, such as mineral or glass wools, may be substituted for part or all of the asbestos. Besides these fibers of an inorganic character, fibrous materials of an organic character, such as paper fibers, redwood bark fibers, etc., may be used. Of course, if the insulating materials are to be used at high temperatures, organic materials decomposed at such temperatures should be avoided. The amount of fiber used may range between roughly five to twenty per cent based on the total solids in the raw mixture, but ten per cent is adequate.

Additional materials such as diluent fillers, preferably of an incombustible nature, may be used with or without a corresponding reduction in the amount of monohydrated alumina in the slurry. Examples of such materials are diatomaceous earth, exfoliated vermiculite, and also any of the inorganic fibrous materials known collectively as mineral wools. These, however, should not be added in such great amounts as to change the essential aluminous character of the blocks upon which some of the properties, especially the shrinkage characteristics, largely depend.

While the mixture including the alumina and oxide produces a material containing aggregates adequately bound together without the employment of any additional cementitious materials, binding materials such as sodium or other alkali metal aluminate, clays, aluminous cement, basic magnesium carbonate, and self-setting crystals of normal magnesium carbonate ($MgCO_3.3H_2O$ or $MgCO_3.5H_2O$) may be added to the mixture. Of these, the clays, aluminous cement, and carbonate, are materials having bonding or cementing properties, per se, while the sodium or other alkali metal aluminate reacts with the alkaline earth oxide in the mixture to produce aluminates which have binding or cementing characteristics.

Any desired order of mixing may be utilized. However, it is preferred to add the fibrous materials during the latter part of the mixing process. If alkali metal aluminates are added, they are usually added to the slurry containing the lime already mixed with the alumina and fibrous materials. The fillers, oxides, and other materials, all finely-subdivided, and then mixed with the fibers form a slurry in water which may be made of any consistency desired, according to the methods of forming the block to be used. Obviously a larger amount of water would be necessary if a filter press is used to form the material while less water may be used if hand molding methods are employed. While it is preferred to employ some pressure (up to forty pounds per square inch) in forming the block or cake from the slurry, because the final blocks so made have greater strength in proportion to the degree of pressure used, yet blocks or cakes formed by permitting the solids to set in the slurry while it is in a quiescent condition and without use of pressure to express water therefrom produces a formed material of sufficient strength for some purposes. The block may be dried by heating to an elevated temperature from about 150° to 400° F. or higher. The elevated temperature is not used to effectuate the reaction between the alkaline earth oxide and the monohydrated alumina as this reaction should take place at about room temperature to produce a well bonded, lightweight material having good insulating properties; it is employed to facilitate the removal of uncombined water from the pressed and reacted block.

The following examples are illustrative of the invention. In the examples and description, the unit in which the conductivities are expressed is B. t. u. per square foot area per hour per °F. difference in temperature per inch thickness.

*Example 1*

A slurry containing forty pounds of monohydrated bauxite (that is, a monohydrated alumina produced from bauxite as a raw material), five pounds of asbestos fiber, and six and six-tenths pounds of slaked lime (equivalent to five pounds of quick lime) is made up in fifty gallons of water. In making this slurry, the bauxite and the lime are added to the water first and mixed thoroughly, after which the fibrous material is added with continued mixing. The slurry is then pumped to a filter press where the water is removed to form a rough block. The rough block is dried, and then shaped or sized to the desired dimensions. The block produced from this material has a flexural strength of ninety pounds per square inch, a compressive strength of 125 pounds per square inch, and conductivities of 0.56 at 400° F. mean temperature through the block and 0.720 at 1200° F. mean temperature. The block has no warpage, and it has a small shrinkage of about 1% at 1800° F.

*Example 2*

A slurry is made up containing thirty-seven pounds of monohydrated bauxite, four and one-half pounds of asbestos fiber, and four and sixty-three hundredths pounds of slaked lime (equivalent of three and one-half pounds of quick lime) in forty-five gallons of water. The order of mixing is the same as in Example 1. The block produced has a flexural strength of forty pounds per square inch, a compressive strength of seventy pounds per square inch, and conductivities of 0.54 at 400° F. mean temperature and 0.685 at 1200° F. mean temperature.

*Example 3*

A slurry is made up containing thirty-four and one-half pounds of monohydrated bauxite, four and one-half pounds of asbestos fiber, the amount of slaked lime equivalent to five and one-half pounds of quick lime in forty-five gallons of water as in the preceding example. The block produced has a flexural strength of eighty-five pounds per square inch, a conductivity of 0.60 at 400° F. mean temperature and a conductivity of 0.725 at 1200° F. mean temperature.

*Example 4*

A slurry is made up containing thirty-seven and one-half pounds of monohydrated bauxite, five and one-half pounds of asbestos fiber, the amount of slaked lime equivalent to eleven pounds of lime in fifty gallons of water as in the preceding example. The block produced from this mixture has a flexural strength of seventy-eight pounds per square inch, a compressive strength of one hundred sixty pounds per square inch, and conductivities of 0.630 at 400° F. mean temperature and of 0.675 at 1200° F. mean temperature.

*Example 5*

A slurry is made up of forty pounds of monohydrated alumina, five pounds of asbestos fiber, and the amount of hydrated dolomitic lime equivalent to six pounds of quick-dolomitic lime in fifty gallons of water, the ingredients being mixed as in the preceding examples. This mixture produces a product having very little shrinkage, no warpage, and low heat conductivity as well as high compression and flexural strength.

*Example 6*

A slurry is made up of forty pounds of monohydrated alumina, five pounds of asbestos fiber, the amount of hydrated lime equivalent to two and three-fourths pounds of quick lime, and two and one-fourth pounds of sodium aluminate, the ingredients being mixed as in the preceding examples in fifty gallons of water. The product has the desired characteristics of low conductivity, a compressive strength of one hundred twenty-five pounds per square inch, and a flexural strength of sixty pounds per square inch and no warpage at elevated temperatures.

*Example 7*

A slurry is made up containing thirty-five pounds of monohydrated alumina, five pounds of diatomaceous earth, five pounds of asbestos fiber, and the amount of hydrated lime equivalent to five pounds of quick lime, the ingredients being mixed as in the preceding example in about fifty gallons of water. The product obtained has low heat conductivity, very low shrinkage, no warpage, and sufficient compressive and flexural strength at elevated temperatures for the usual applications of such block.

While it is not desired to be limited to any theory of operation, yet it may help in understanding the remarkable characteristics of this block to make some attempt to explain what happens in the process of producing the block. The monohydrated alumina as described above (referred to simply as alumina hereinafter in this discussion of the theory) forms the essential structure of the block, the fibrous material lending additional strength and coherence between the aggregates of alumina and other fillers while the lime apparently in conjunction with the alumina, or at least with the surfaces of the aggregates, forms a binding material linking the alumina aggregates with the fibers. It appears that there is some chemical union between the particles of alumina and the lime forming a continuous gradation from the aggregates to the cementitious material. This union between the filler particles and the binder resulting from the reaction therebetween in the cold is superior to conventional cementing bonds in such blocks where the juncture between the particles of filler and the cement are more distinct and abrupt and therefore more liable to cleavage. It is not known definitely what the constitution of this bonding material at the juncture is, but it probably is some form of an aluminate of the respective alkaline earth oxide used in the raw mixture. The procedure of this invention, in which the binding material is formed in situ by a wet process and in which the aluminous aggregates take part in the bonding action by interfacial reaction with the alkaline earth oxides, is in strong contrast with procedures heretofore used in which a cement is formed separately by a dry or calcining process and is then added to a slurry of inert aggregates. In the former case, it is believed that some chemical action of the lime upon the alumina produces a more gradual transition from aggregate through binder to aggregate than in the case where the aluminous cement is added to the aggregates after being formed separately, thereby producing a material in the former case which is less liable to cleavage and which has greater flexural and compressive strengths.

Materials within the preferred range of eight per cent to twenty-two per cent alkaline earth oxide include blocks having properties which may be summarized as follows:

Flexural strength ranges from about thirty-two to ninety pounds per square inch, compressive strength ranges from about seventy to one hundred and seventy-five pounds per square inch to as high as two hundred and fifty pounds per square inch with some of the compositions, while the range of thermal conductivity is from about 0.535 to 0.6 at 400° F. mean temperature to 0.60 to 0.740 at 1200° F. mean temperature. The compositions show no warpage and the shrinkage is about one per cent after soaking at 1800° F. for about twenty-four hours.

The heat-insulating block produced by this invention may be used for insulating furnaces, such as blast furnaces, electrically heated furnaces, annealing furnaces, kilns, and other contrivances operated at elevated temperatures up to about 1900° F. Obviously, it may be used wherever a heat resistant composition having low heat conductivity is required.

While the invention has been disclosed in terms of specific examples employing certain materials in definitely stated proportions and certain procedures, the description is intended to be merely illustrative. It is obvious that various modifications may be made without departing from the spirit of the invention and it is to be understood that the invention is limited only by the appended claims.

I claim:

1. A heat insulating material comprising the dried residue of a slurry containing intimately mixed therein a finely divided, monohydrated alumina which is reactive with hydrated alkaline earth oxide at room temperature; fibrous material; water; and from about five percent to about forty percent by weight, based on the monohydrated alumina in said slurry, of hydrated alkaline earth oxide when calculated as alkaline earth oxide.

2. A heat insulating material in accordance with claim 1 in which the hydrated alkaline earth oxide is present in the slurry in an amount equivalent to eight percent to about twenty-two percent by weight, based on the monohydrated alumina in said slurry, when calculated as alkaline earth oxide.

3. A heat insulating material in accordance with claim 1 in which the hydrated alkaline earth oxide is calcium hydroxide.

4. A heat insulating material in accordance with claim 1 in which the fibrous material is a noncombustible inorganic fibrous material.

5. A heat insulating material in accordance with claim 1 in which the hydrated alkaline earth oxide is present in the slurry in an amount equivalent to about eight percent to about twenty-two percent by weight, based on the monohydrated alumina in said slurry, when calculated as alkaline earth oxide, and in which there is included in the slurry a diatomaceous earth diluent filler.

6. A heat insulating material comprising the dried residue of a slurry containing intimately mixed therein a finely divided, monohydrated alumina which is reactive with hydrated alkaline earth oxide at room temperature; fibrous material; water; and from about eight percent to about twenty-two percent by weight, based on the monohydrated alumina in said slurry, of calcium hydroxide when calculated as calcium oxide, said dried material having a flexural strength of thirty-two pounds per square inch or greater.

7. A heat insulating material in accordance with claim 6 in which the calcium hydroxide is present in the slurry in an amount equivalent to about ten percent to about fourteen percent by weight, based on the monohydrated alumina in said slurry, when calculated as calcium oxide.

8. A heat insulating material in accordance with claim 6 in which the calcium hydroxide is in an amount equivalent to about ten percent by weight, based on the monohydrated alumina in said slurry, when calculated as calcium oxide.

9. A heat insulating material in accordance with claim 6 in which the monohydrated alumina is monohydrated bauxite.

10. A heat insulating material in accordance with claim 6 in which there is included in the slurry a diluent filler.

11. A heat insulating material in accordance with claim 6 in which the fibrous material is a noncombustible inorganic fibrous material and in which the calcium hydroxide is present in the slurry in an amount equivalent to about five percent to about forty percent by weight, based on the monohydrated alumina in said slurry, when calculated as calcium oxide.

12. A heat insulating material in accordance with claim 6 in which the fibrous material is a noncombustible inorganic fibrous material and in which the calcium hydroxide is present in the slurry in an amount equivalent to about ten percent to about fourteen percent by weight, based on the monohydrated alumina in said slurry, when calculated as calcium oxide.

13. A heat insulating material in accordance with claim 6 in which the fibrous material is a noncombustible inorganic fibrous material and in which the calcium hydroxide is present in the slurry in an amount equivalent to about ten percent by weight, based on the monohydrated alumina in said slurry, when calculated as calcium oxide.

14. A heat insulating material comprising the dried residue of a slurry containing intimately mixed therein a finely divided, monohydrated alumina which is reactive with hydrated alkaline earth oxide at room temperature; fibrous material; a material which per se has a cementitious character; water; and from about five percent to about forty percent by weight, based on the monohydrated alumina in said slurry, of hydrated alkaline earth oxide when calculated as alkaline earth oxide.

15. A heat insulating material in accordance with claim 14 in which the hydrated alkaline earth oxide is calcium hydroxide present in the slurry in an amount equivalent to about eight percent to about twenty-two percent by weight, based on the monohyrated alumina in said slurry, when calculated as calcium oxide, and in which the material having a cementitious character per se is self-setting crystals of normal magnesium carbonate.

16. A heat insulating material in accordance with claim 14 in which there is incorporated in the slurry an alkali metal aluminate.

17. A heat insulating material in accordance with claim 14 in which there is incorporated in the slurry sodium aluminate.

18. A heat insulating material in accordance with claim 1 in which there is incorporated in the slurry an alkali metal aluminate.

CONRAL C. CALLIS.